United States Patent
Schaub et al.

(10) Patent No.: US 10,293,782 B1
(45) Date of Patent: May 21, 2019

(54) METHOD AND APPARATUS FOR PROVIDING SEATBELT NOTIFICATIONS

(71) Applicant: GM GLOBAL TECHNOLOGY OPERATIONS LLC, Detroit, MI (US)

(72) Inventors: Carl N Schaub, Rochester, MI (US); Orhan Demirovic, Sterling Heights, MI (US); Thomas P Deming, Milford, MI (US); Hong Tang, Bloomfield Township, MI (US); Bongkyu Park, Rochester, MI (US); Jaywan Kim, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/861,302

(22) Filed: Jan. 3, 2018

(51) Int. Cl.
*B60Q 9/00* (2006.01)
*B60N 2/00* (2006.01)
*B60Q 1/00* (2006.01)
*B60R 22/48* (2006.01)

(52) U.S. Cl.
CPC ............. *B60R 22/48* (2013.01); *B60N 2/002* (2013.01); *B60Q 9/00* (2013.01); *B60R 2022/4816* (2013.01)

(58) Field of Classification Search
CPC ...... B60N 2/002; B60N 2/282; B60N 2/2812; B60N 2/2821; B60R 16/023; B60R 21/01546; B60R 22/03; B60R 22/18
See application file for complete search history.

(56) References Cited

U.S. PATENT DOCUMENTS

| | | | | |
|---|---|---|---|---|
| 6,082,819 A | * | 7/2000 | Jackson | B60N 2/2821 297/250.1 |
| 6,481,750 B1 | * | 11/2002 | Kalina | B60N 2/002 280/801.1 |
| 7,224,270 B2 | * | 5/2007 | Patterson | B60N 2/002 280/801.1 |
| 7,466,221 B1 | * | 12/2008 | Lehr | B60N 2/2812 340/457.1 |
| 7,965,170 B2 | * | 6/2011 | Nathan | B60N 2/002 340/5.1 |
| 9,688,220 B2 | * | 6/2017 | Drake | B60R 16/023 |
| 2003/0024327 A1 | * | 2/2003 | Garver | B60R 22/18 73/862.393 |
| 2004/0217583 A1 | * | 11/2004 | Wang | B60R 22/03 280/805 |
| 2006/0006713 A1 | * | 1/2006 | Patterson | B60N 2/002 297/250.1 |
| 2008/0084290 A1 | * | 4/2008 | Hawkins | B60R 21/01546 340/457.1 |
| 2010/0138113 A1 | * | 6/2010 | Lee | B60Q 9/00 701/45 |
| 2014/0253314 A1 | * | 9/2014 | Rambadt | B60N 2/002 340/457.1 |

(Continued)

*Primary Examiner* — Hoi C Lau

(57) ABSTRACT

A method and apparatus for providing a seatbelt reminder are provided. The method includes determining whether a seat is occupied, in response to determining that the seat is occupied, determining whether a seatbelt corresponding to the seat is buckled, in response to determining that the seatbelt corresponding to the seat is unbuckled, determining whether a latch anchor corresponding to the seat is engaged, and in response to determining that the latch anchor corresponding to the seat is unengaged, outputting a seatbelt reminder notification.

10 Claims, 2 Drawing Sheets

(56) References Cited

U.S. PATENT DOCUMENTS

| | | | | |
|---|---|---|---|---|
| 2015/0367789 A1* | 12/2015 | Drake | ................... | B60R 16/023 |
| | | | | 701/1 |
| 2016/0002959 A1* | 1/2016 | Javadzadeh | ............. | E05B 77/12 |
| | | | | 701/46 |
| 2017/0129399 A1* | 5/2017 | Appukutty | ............... | B60Q 9/00 |

* cited by examiner

METHOD AND APPARATUS FOR PROVIDING SEATBELT NOTIFICATIONS

INTRODUCTION

Apparatuses and methods consistent with exemplary embodiments relate to providing seatbelt reminders. More particularly, apparatuses and methods consistent with exemplary embodiments relate to providing reminders to buckle a seatbelt.

SUMMARY

One or more exemplary embodiments provide a method and an apparatus that suppress a seatbelt reminder. More particularly, one or more exemplary embodiments provide a method and an apparatus that suppress a seatbelt reminder when an anchor latch is engaged.

According to an aspect of an exemplary embodiment, a method for providing a seatbelt reminder is provided. The method includes determining whether a seat is occupied, in response to determining that the seat is occupied, determining whether a seatbelt corresponding to the seat is buckled, in response to determining that the seatbelt corresponding to the seat is unbuckled, determining whether a latch anchor corresponding to the seat is engaged, and in response to determining that the latch anchor corresponding to the seat is unengaged, outputting a seatbelt reminder notification. The seat may be a seat in a second row or a third row of seats in a vehicle.

The determining whether the seat is occupied may include analyzing seat sensor information to determine whether the seat is occupied.

The determining whether the seatbelt corresponding to the seat is buckled may include detecting whether a seatbelt buckle is engaged based on information from a switch or a sensor that is part of the seatbelt buckle.

The determining whether the latch anchor corresponding to the seat is engaged ma include detecting whether the latch anchor is engaged based on information from a switch or a sensor that is part of the latch anchor.

The outputting of the seatbelt reminder notification may include outputting a chime, displaying a graphic on display, or illuminating a light in an instrument panel.

According to an aspect of an exemplary embodiment, a method for providing a seatbelt reminder is provided. The method includes determining whether a seat is occupied, in response to determining that the seat is occupied, determining whether a seatbelt corresponding to the seat is buckled, in response to determining that the seatbelt corresponding to the seat is unbuckled, determining whether a latch anchor corresponding to the seat is engaged, and in response to determining that the latch anchor corresponding to the seat is engaged, suppressing a seatbelt reminder notification. The seat may be a seat in a second row or a third row of seats in a vehicle.

The determining whether the seat is occupied may include analyzing seat sensor information to determine whether the seat is occupied.

The determining whether the seatbelt corresponding to the seat is buckled may include detecting whether a seatbelt buckle is engaged based on information from a switch or a sensor that is part of the seatbelt buckle.

The determining whether the latch anchor corresponding to the seat is engaged ma include detecting whether the latch anchor is engaged based on information from a switch or a sensor that is part of the latch anchor.

According to an aspect of another exemplary embodiment, an apparatus for providing a seatbelt reminder is provided. The apparatus includes at least one memory comprising computer executable instructions; and at least one processor configured to read and execute the computer executable instructions. The computer executable instructions cause the at least one processor to determine whether a seat is occupied, determine whether a seatbelt corresponding to the seat is buckled and whether a latch anchor corresponding to the seat is engaged if it is determined that the seat is occupied, and output a seatbelt reminder notification if it is determined that the seatbelt corresponding to the seat is unbuckled and latch anchor corresponding to the seat is engaged. The seat may be a seat in a second row or a third row of seats in a vehicle.

The apparatus may also include an occupant sensor configured to output occupant sensor information indicating whether the seat is occupied, and the computer executable instructions may cause the at least one processor to determine whether the seat is occupied by analyzing the seat sensor information from the seat sensor.

The apparatus may also include a seatbelt sensor configured to output information indicating whether the seatbelt is buckled, and the computer executable instructions may further cause the at least one processor to determine whether the seatbelt corresponding to the seat is buckled by detecting whether the seatbelt buckle is engaged based on information from the seatbelt sensor.

The apparatus may also include a latch anchor sensor configured to output information indicating whether the latch anchor is engaged, and the computer executable instructions may further cause the at least one processor to determine whether the latch anchor corresponding to the seat is engaged based on information from the latch anchor sensor.

The apparatus may also include a speaker configured to output the audible seatbelt reminder notification, and the computer executable instructions may further cause the at least one processor to control to output the seatbelt reminder notification through the speaker.

The apparatus may also include a display configured to display a graphic corresponding to the seatbelt reminder notification, and the computer executable instructions may further cause the at least one processor to control to output the seatbelt reminder notification on the display.

The apparatus may also include an instrument panel light configured to illuminate a graphic corresponding to the seatbelt reminder notification, and the computer executable instructions may further cause the at least one processor to control the instrument panel light to illuminate the graphic corresponding to the seatbelt reminder notification.

Other objects, advantages and novel features of the exemplary embodiments will become more apparent from the following detailed description of exemplary embodiments and the accompanying drawings.

DETAILED DESCRIPTION

Figure 1:
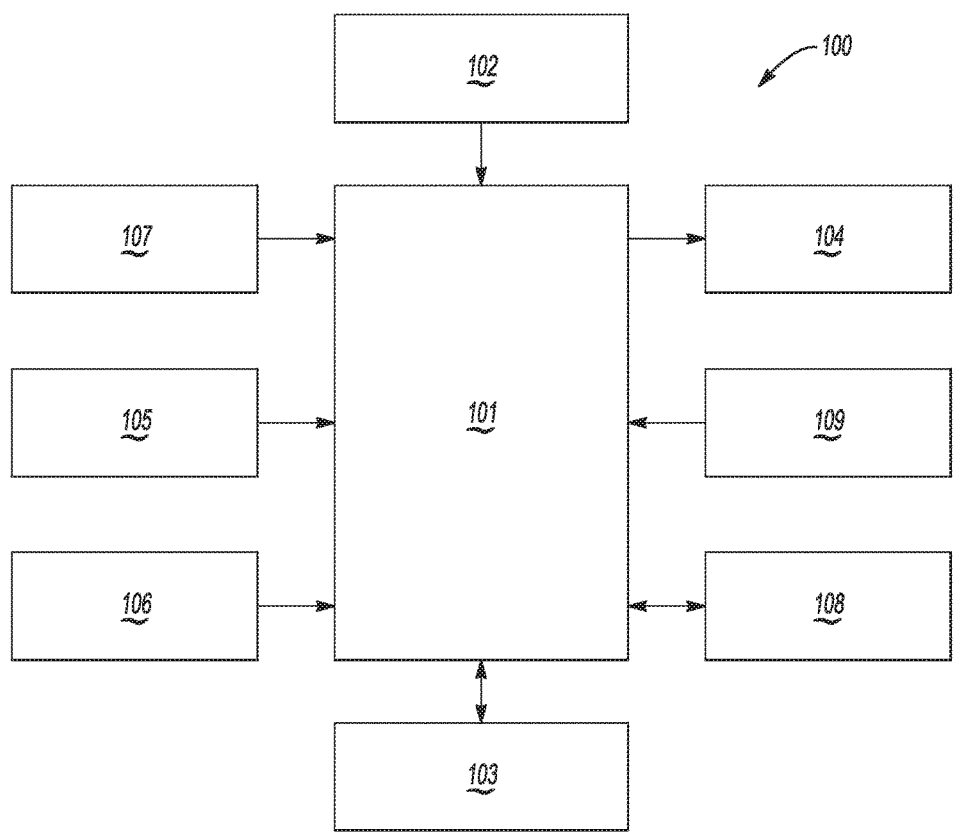
FIG. 1 shows a block diagram of an apparatus that provides a seatbelt reminder according to an exemplary embodiment.

An apparatus and method that provide a seatbelt reminder will now be described in detail with reference to FIGS. 1 and 2 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles such as passenger cars, trucks, sports utility vehicles (SUVs), recreational vehicles (RVs), marine vessels, aircraft, etc., may be required to have restraining devices such as seatbelts to hold occupants in place in case of an accident or other event that places a force on a vehicle and causes the occupant to be ejected or thrown from a seat. However, occupants may neglect or forget to fasten their seatbelts.

To address the issue of unfastened seatbelts, vehicles may be equipped and configured to output a seatbelt reminder notification when an occupant is detected in a seat and the seatbelt is determined to be unfastened. The notification may be in the form of one or more from among an instrument panel light, an audible notification, or a displayed notification output to remind the occupant to fasten the seatbelt. In some instances, a child seat may be present on a seat corresponding to unfastened seatbelt and the presence of the child seat may trigger the seatbelt reminder notification. In this case, the child seat may trigger an improper or incorrect seatbelt reminder notification because the seatbelt is not required to be fastened for certain types of child seats.

One way to address the issue of an improper to incorrect seatbelt reminder notification is determine whether the child seat is anchored to the seat by latch anchors (i.e., anchor latches). Thus, if it is determined that the child seat is anchored to the seat by latch anchors, the seatbelt reminder notification may be suppressed or may not be output. By suppressing, bypassing or not outputting the seatbelt reminder, the issue of improper or incorrect seatbelt reminder notifications due to the presence of child seats may be addressed.

FIG. 1 shows a block diagram of an apparatus that provides a seatbelt reminder 100 according to an exemplary embodiment. As shown in FIG. 1, the apparatus provides a seatbelt reminder 100, according to an exemplary embodiment, includes a controller 101, a power supply 102, a storage 103, an output 104, a seatbelt sensor 105, a user input 106, a latch sensor 107, a communication device 108 and an occupant sensor 109. However, the apparatus provides a seatbelt reminder 100 is not limited to the aforementioned configuration and may be configured to include additional elements and/or omit one or more of the aforementioned elements. The apparatus provides a seatbelt reminder 100 may be implemented as part of a vehicle or as a standalone component.

The controller 101 controls the overall operation and function of the apparatus provides a seatbelt reminder 100. The controller 101 may control one or more of a storage 103, an output 104, a seatbelt sensor 105, a user input 106, a latch sensor 107, a communication device 108 and an occupant sensor 109 of the apparatus provides a seatbelt reminder 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the seatbelt sensor 105, the latch sensor 107, the communication device 108 and the occupant sensor 109 of the apparatus provides a seatbelt reminder 100. The information may be sent and received via a bus or network, or may be directly read or written to/from one or more of the storage 103, the output 104, the seatbelt sensor 105, the user input 106, the latch sensor 107, the communication device 108 and the occupant sensor 109 of the apparatus provides a seatbelt reminder 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the seatbelt sensor 105, the user input 106, the latch sensor 107, the communication device 108 and the occupant sensor 109 of the apparatus provides a seatbelt reminder 100. The power supply 102 may include one or more from among a battery, an outlet, a capacitor, a solar energy cell, a generator, a wind energy device, an alternator, etc.

The storage 103 is configured for storing information and retrieving information used by the apparatus provides a seatbelt reminder 100. The storage 103 may be controlled by the controller 101 to store and retrieve occupant sensor information, latch sensor information and seatbelt sensor information. The occupant sensor information, latch sensor information and seatbelt sensor information include information about the status of one or more occupants of seats, one or more anchor latches or one or more seatbelts, respectively. The storage 103 may also include the computer instructions configured to be executed by a processor to perform the functions of the apparatus provides a seatbelt reminder 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 is configured to output information in one or more forms including: visual, audible and/or haptic form.

The output 104 may be controlled by the controller 101 to provide outputs to the user of the apparatus provides a seatbelt reminder 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, a horn, a piezoelectric device, etc. In addition, the output 104 may also include a transparent display located on one or more of a windshield, a rear window, side windows, and mirrors of a vehicle.

The output 104 may output a notification including one or more from among an audible notification, a light notification, and a display notification. The notification may include information indicating a seatbelt is not fastened. The output 104 may display a graphical indicator to attract a user's attention to the alert or notification. The output 104 may also output an audible notification such as one or more chimes or beeps.

The seatbelt sensor 105 may include a switch configured to send a signal indicating that a seatbelt buckle is engaged. The seatbelt sensor 105 may include one or more from among a magnetic sensor, a Hall Effect sensor, a reed switch, an electrical switch, or a mechanical switch. The seatbelt sensor 105 may also be configured to output a signal indicating that a seatbelt buckle is unengaged or seatbelt status information.

The user input 106 is configured to provide information and commands to the apparatus provides a seatbelt reminder 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the alert or notification output by the output 104. The user input 106 may also be configured to receive a user input to cycle through notifications or different screens of a notification.

The latch sensor 107 is configured to detect a presence of a child seat or baby seat. The latch sensor 107 may be part of a latch anchor or configured to detect when a latch anchor is engaged with a child seat. The latch sensor may be one or more from among a magnetic sensor, a Hall Effect sensor, a reed switch, an electrical switch, or a mechanical switch. The latch sensor 107 may also be configured to output a signal indicating that a latch anchor is unengaged or latch status information.

The communication device 108 may be used by the apparatus provides a seatbelt reminder 100 to communicate with various types of internal or external apparatuses according to various communication methods. According to one example, the communication device 108 may be configured to send latch status information and/or seatbelt status information to the controller 101 of the apparatus that provides a seatbelt reminder 100 and receive latch anchor status information and/or seatbelt status information from the seatbelt sensor 105 and the latch sensor 107. The communication device 108 may also be configured to transmit the seatbelt reminder notification to an output device or display, such as output 104 or a mobile device.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The occupant sensor 109 is configured to detect a presence of an object or person in a seat. The occupant sensor 109 may be part of a seat or may configured to detect whether an object is in a seat. The occupant sensor may be one or more from among a seat sensor, a pressure sensor, a capacitive sensor, a resistive sensor, a weight sensor, an optical sensor, a magnetic sensor, a hall effect sensor, a reed switch, an electrical switch, or a mechanical switch. The occupant sensor 109 may also be configured to output a signal indicating an object or occupant is present on a seat.

The controller 101 of the apparatus provides a seatbelt reminder 100 may be configured to determine whether a seat is occupied, determine whether a seatbelt corresponding to the seat is buckled and whether a latch anchor corresponding to the seat is engaged if it is determined that the seat is occupied, and output a seatbelt reminder notification if it is determined that the seatbelt corresponding to the seat is unbuckled and latch anchor corresponding to the seat is engaged. The seat may be a seat in a second row or third row of a vehicle, or a seat in an area behind the first row of vehicle seats.

The controller 101 of the apparatus provides a seatbelt reminder 100 may also be configured to determine whether the seat is occupied by analyzing the occupant information from an occupant sensor. The controller 101 of the apparatus provides a seatbelt reminder 100 may also be configured to determine whether the seatbelt corresponding to the seat is buckled by detecting whether the seatbelt buckle is engaged based on information from a seatbelt sensor. The controller 101 of the apparatus provides a seatbelt reminder 100 may also be configured to determine whether the latch anchor corresponding to the seat is engaged based on information from the latch anchor sensor.

The controller 101 of the apparatus provides a seatbelt reminder 100 may be configured to control to output the seatbelt reminder notification through the speaker. The controller 101 of the apparatus provides a seatbelt reminder 100 may also be configured to control to output the seatbelt reminder notification on the display. In addition, the controller 101 of the apparatus provides a seatbelt reminder 100 may be configured to control the instrument panel light to illuminate the graphic corresponding to the seatbelt reminder notification.

Figure 2:
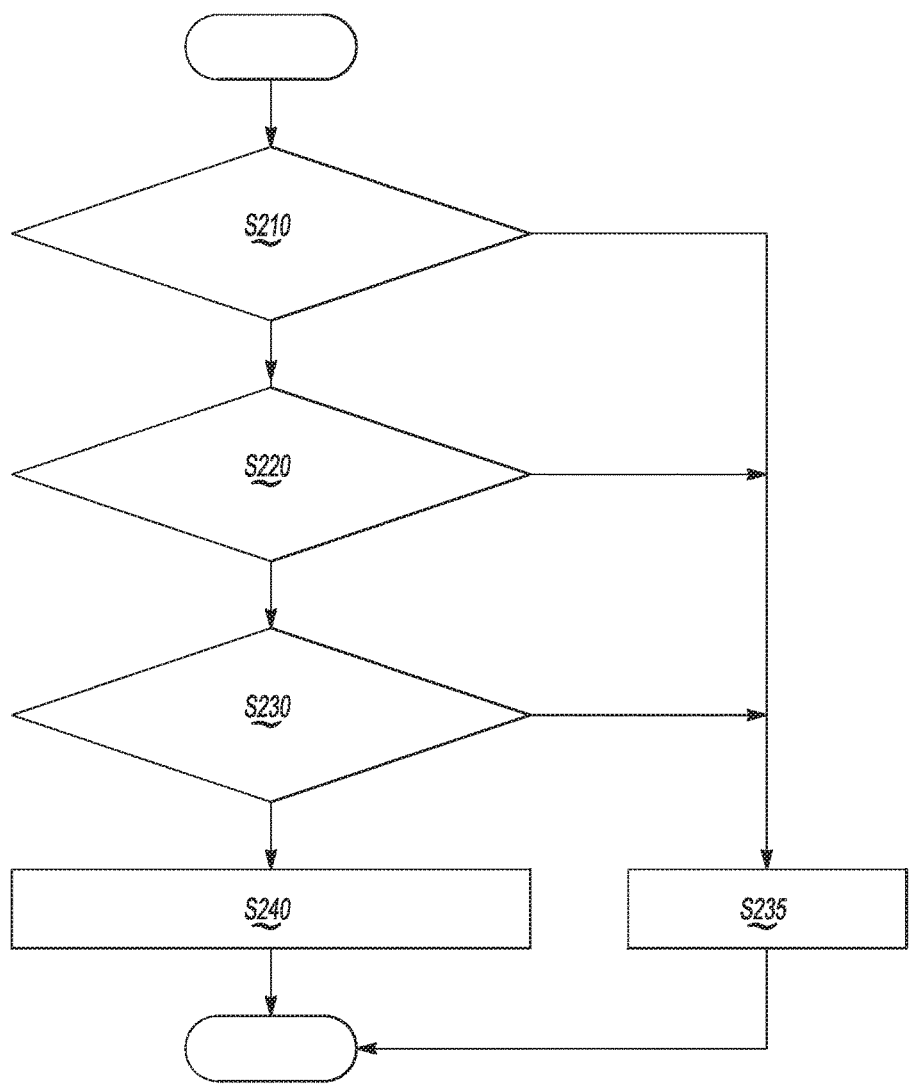
FIG. 2 shows a flowchart for a method for providing a seatbelt reminder according to an exemplary embodiment.

FIG. 2 shows a flowchart for a method for providing a seatbelt reminder according to an exemplary embodiment.

The method of FIG. 2 may be performed by the apparatus provides a seatbelt reminder 100 or may be encoded into a computer readable medium as instructions that are executable by a computer to perform the method.

Referring to FIG. 2, it is determined whether a seat is occupied in operation S210. If the seat is not occupied (operation S210—No), the method proceeds to suppress the seatbelt reminder notification in operation S235 or does not output a seatbelt reminder notification and ends. If the seat is occupied (operation S210—Yes), then it is determined whether a seatbelt corresponding to the occupied seat is buckled in operation S220. The status of seatbelt buckle is determined from seatbelt sensor information.

If it is determined that the seatbelt corresponding to the occupied seat is buckled (operation S220—Yes), then the method proceeds to suppress the seatbelt reminder notification in operation S235 or does not output a seatbelt reminder notification and ends. If it is determined that the seatbelt corresponding to the occupied seat is unbuckled (operation S220—No), then it is determined whether the latch anchor is engaged in operation S230. The status of latch anchor is determined from latch sensor information.

If the latch anchor is engaged (operation S230—Yes), then the method proceeds to suppress the seatbelt reminder notification in operation S235 or does not output a seatbelt reminder notification and ends. If the latch anchor is disengaged (operation S230—No), then the method proceeds to output the seatbelt reminder notification in operation S240.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for providing a seatbelt reminder, the method comprising:
    determining, by a processor, whether a seat is occupied by analyzing seat sensor information from a seat sensor;
    in response to determining that the seat is occupied, determining, by the processor, whether a seatbelt corresponding to the seat is buckled;
    in response to determining that the seatbelt corresponding to the seat is unbuckled, determining, by the processor, whether a latch anchor corresponding to the seat is engaged; and
    in response to determining that the latch anchor corresponding to the seat is unengaged, outputting, by the processor, a seatbelt reminder notification.

2. The method of claim 1, wherein the seat comprises a seat in a second row or a third row of seats in a vehicle.

3. The method of claim 2, wherein the determining whether the seatbelt corresponding to the seat is buckled comprises detecting whether a seatbelt buckle is engaged based on information from a switch or a sensor that is part of the seatbelt buckle.

4. The method of claim 2, wherein the determining whether the latch anchor corresponding to the seat is engaged comprises detecting whether the latch anchor is engaged based on information from a switch or a sensor that is part of the latch anchor.

5. The method of claim 1, wherein the outputting a seatbelt reminder notification comprises outputting a chime, displaying a graphic on display, or illuminating a light in an instrument panel.

6. A method for suppressing a seatbelt reminder, the method comprising:
    determining, by a processor, whether a seat is occupied by analyzing seat sensor information from a seat sensor;
    in response to determining that the seat is occupied, determining, by the processor, whether a seatbelt corresponding to the seat is buckled;
    in response to determining that the seatbelt corresponding to the seat is unbuckled, determining, by the processor, whether a latch anchor corresponding to the seat is engaged; and
    in response to determining that the latch anchor corresponding to the seat is engaged, suppressing, by the processor, a seatbelt reminder notification.

7. The method of claim 6, wherein the seat comprises a seat in a second row or a third row of seats in a vehicle.

8. The method of claim 7, wherein the determining whether the seatbelt corresponding to the seat is buckled comprises detecting whether a seatbelt buckle is engaged based on information from a switch or a sensor that is part of the seatbelt buckle.

9. The method of claim 7, wherein the determining whether the latch anchor corresponding to the seat is engaged comprises detecting whether the latch anchor is engaged based on information from a switch or a sensor that is part of the latch anchor.

10. A non-transitory computer readable medium comprising computer executable instructions executable by a processor to perform the method of claim 6.

* * * * *